Figures 1, 2:
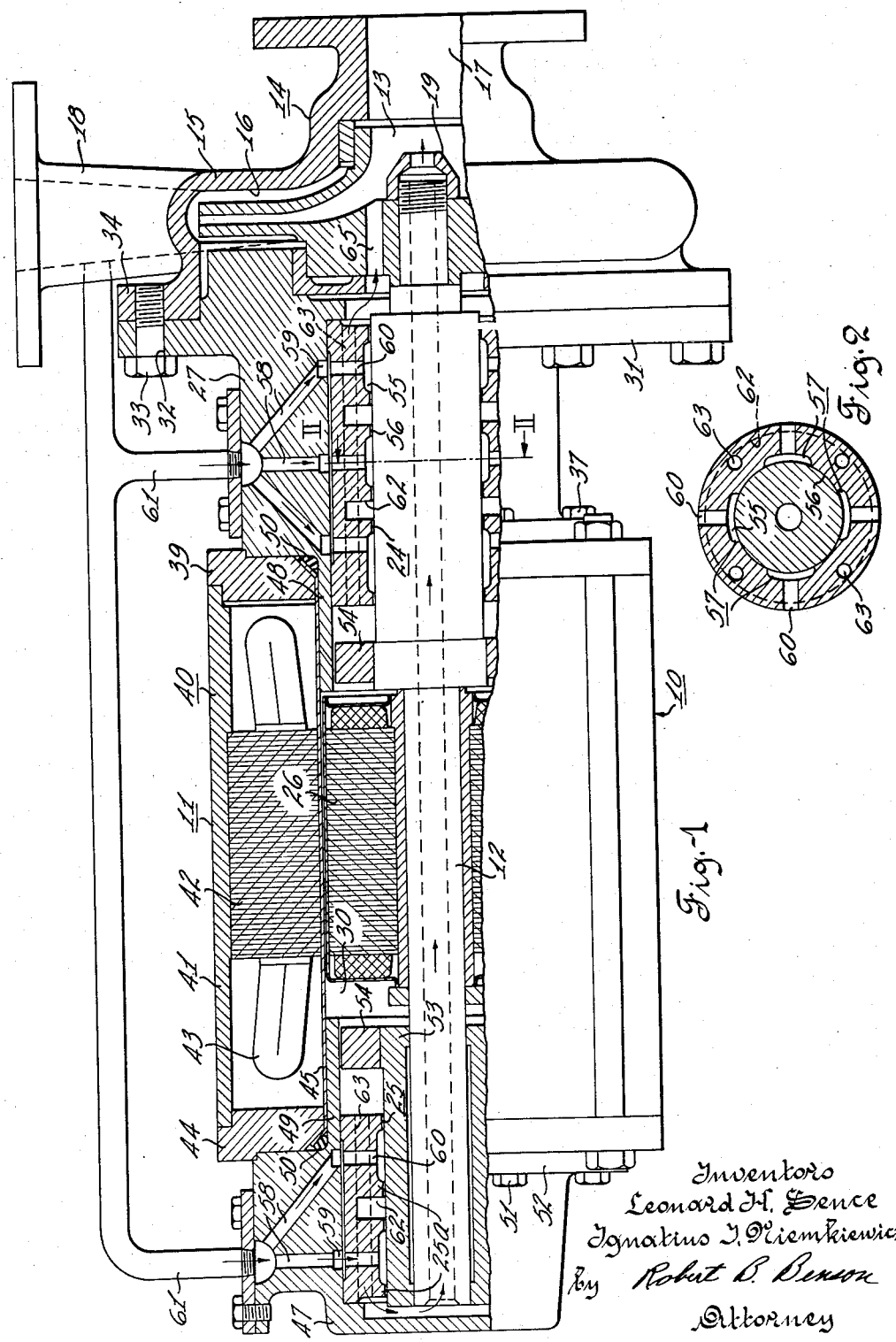

Jan. 21, 1964    L. H. SENCE ETAL    3,118,384
BEARING FOR MOTOR PUMP UNITS
Filed Aug. 3, 1961

Inventors
Leonard H. Sence
Ignatius J. Niemkiewicz
by Robert P. Benson
Attorney

United States Patent Office 3,118,384
Patented Jan. 21, 1964

3,118,384
BEARINGS FOR MOTOR PUMP UNITS
Leonard H. Sence, Milford, and Ignatius J. Niemkiewicz, Cincinnati, Ohio, assignors to Allis-Chalmers Manufacturing Company, Milwaukee, Wis.
Filed Aug. 3, 1961, Ser. No. 129,101
6 Claims. (Cl. 103—87)

This application relates generally to centrifugal pumps. More specifically, this invention relates to canned motor pumps utilizing fluid pressure bearings to support the rotating elements of these units.

Fluid pressure bearings or hydrostatic bearings as they are sometimes called comprise a series of pockets arcuately spaced around the inner periphery of the bearing. This bearing then surrounds a rotating shaft. Fluid under pressure is directed into these pockets so that they may support the rotating shaft. Actually the shaft rotates on the fluid and there is no metal to metal contact. Furthermore, the bearing is self-centering in this way. If the shaft tends to drift in one direction it closes off the outlet between the shaft and the pressure pocket thereby increasing the pressure on that side of the bearing. Simultaneously on the other side of the bearing the space between the shaft and the pressure pocket increases allowing more fluid to escape and thereby reducing the pressure in that pocket. The unbalanced pressure moves the shaft away from the high pressure side and toward the low pressure side. Consequently the shaft is continually being centered relative to the bearing. However, at no time during operation when adequate pressure is maintained in the pressure pockets does the shaft actually come in contact with the bore of the bearing.

Fluid pressure bearings have been extremely successful in centrifugal pump units because of the ready supply of high pressure fluid that can be tapped directly from the discharge side of the pump and channeled into the pressure bearings. However, as the size of these units increases, the bearing requirements also increase and higher pressure or a greater number of pressure pockets are required to support the shaft. Sometimes the higher pressure liquid is not readily available. However, even if the higher pressure liquid is available in bearings of this type there is an optimum relationship between the size of the bearing pockets and the pressure. Exceeding the optimum pressure for a particular bearing causes problems such as inefficiency and excessive leakage. Furthermore, the fluid that leaks out of the bearing between the bearing and the shaft is directed into the rotor chamber and against the canned rotor of the motor driving the pump. This fluid flowing in the rotor chamber is a drag on the rotor and greatly reduces the efficiency of the motor pump unit.

The motor pump unit of this invention overcomes these problems by providing a number of parallel fluid pressure bearings instead of a single bearing and providing means for directing the fluid leaking out of the bearings back to the suction side of the pump impeller so as to relieve the fluid pressure on the rotor and to eliminate the flow of fluid in the rotor cavity within the stator can. This arrangement requires a lower fluid pressure for the individual bearings and provides an increased unit efficiency by reducing the flow in and around the rotor can.

Therefore, it is the object of this invention to provide a new and improved motor pump unit.

Another object of this invention is to provide a new and improved fluid pressure bearing arrangement.

Another object of this invention is to provide a new and improved canned motor centrifugal pump unit.

Another object of this invention is to provide a new and improved fluid pressure bearing arrangement for motor pump units.

Other objects and advantages of this invention will be apparent from the following description when read in connection with the accompanying drawing, in which:

FIG. 1 is a cross section view of a canned motor pump unit incorporating the fluid pressure bearing arrangement of this invention; and FIG. 2 is a cross section view of a fluid pressure bearing of FIG. 1 taken along the line II—II.

This invention is illustrated in a canned motor pump unit. However, the invention is applicable to any rotating member that is supported by fluid pressure bearings.

Referring more specifically to the drawing by characters of reference, the motor pump unit 10 comprises generally an electric motor 11 driving a hollow shaft 12 which in turn is operatively connected to the impeller 13 of a centrifugal pump 14.

The pump 14 comprises a casing 15 defining therein an impeller chamber 16 having an axial inlet 17 and a radially spaced discharge 18. The impeller 13 is positioned within the impeller chamber 16 and is mounted on the shaft 12 by a nut 19.

The shaft 12 is journaled by front and rear bearings 24 and 25 positioned on either side of the motor rotor 26. The front bearing 24 is mounted in a bearing housing 27 which also forms the rear cover of the impeller chamber 16. The front bearing housing 27 may be connected to the pump casing in any suitable way but as illustrated it has an annular flange 31 having arcuately spaced holes 32 formed therein. Bolts 33 extend through these holes 32 and threadedly engage a flange 34 on the pump casing 15 to mount the bearing housing on the pump casing. The other end of the front bearing housing 27 is connected to the rear end cover 39 of the motor housing 40 by bolts 37 and thus closes off one end of the rotor chamber 30.

The motor housing 40 comprises an annular yoke 41 encircling the stator core 42 and windings 43 and has front and rear covers 44, 39, respectively. A cylindrical stator can 45 is positioned within the bores of the stator core 42 and the end covers 39, 44 to define the rotor chamber 30 of the motor. The stator can is made of relatively thin nonmagnetic material as is well known in the art. The motor rotor 26 is mounted on the shaft 12 and positioned within the stator can 45 and aligned axially with the stator core 42. The ends of the rotor chamber 30 are closed by the front and rear bearing housings 27 and 47. The bearing housings 27, 47 have annular flanges 48, 49 that extend axially into the rotor chamber 30 toward the rotor 26.

The ends of the stator can 45 extend between the bore of the end covers 44, 39 and the flanges 48, 49 and are sealed therein by O-rings 50. The rear bearing housing 47 that surrounds the bearing 25 is bell shaped and fits over the end of the shaft 12. The rear bearing housing 47 is connected to the motor housing by bolts 51 which extend through holes in an annular flange 52 on the bearing housing and threadedly engage appropriately arranged holes in the end cover 44.

The shaft 12 may be equipped with suitable shaft liners 53 immediately below the bearings such as shown beneath the rear bearing 25. These liners 53 are usually made of a tough durable material such as stainless steel and are designed to absorb the wear, if any, between the rotating and stationary parts. Mounted on the inboard end of these shaft liners or on the shaft if preferred are flame path bushings 54. These bushings 54 are designed to define a very close clearance between the bushings and the annular flanges 48, 49 to confine and extinguish any flames that may result from explosions within the rotor chamber.

The bearings of this invention are known as fluid pressure bearings and operate on the principle of supplying high pressure fluid to pockets on the bore of the bearing. Specifically, the bearings 24, 25 are annular in shape and have a series of arcuately spaced pockets or cavities 55 formed on the radially inner surface 56 of the bearings. In the illustrated arrangement, the bearing also has a plurality of axially spaced sets 57 of cavities 55. However, the composite bearing could be made up of a plurality of separate fluid pressure bearing members 25a stacked or joined together to form the arrangement illustrated by bearing 25 in the drawing.

Each set 57 of bearing cavities is supplied fluid under pressure independently through separate passages 58 in the bearing housing 27, 47. These passages 58 terminate in an annular grooves 59 on the radially inner surface of the bearing housing 27, 47. Each of these annular grooves 59 is in communication with a different set 57 of bearing cavities 55 through radial holes 60 extending out from the individual cavities. The other end of the passages is connected to a pipe 61 that delivers fluid under pressure. As shown in the drawings, the pipe 61 is connected to the discharge side of the pump hence the passages 58 form hydraulically parallel connections between the pipe 61 and the sets 57 of cavities 55 in the bearing housings.

Separate passages 58 in the bearing housing to each set 57 of bearing cavities are provided to maintain a balanced flow of liquid into the cavities 55 at a velocity that is above the settling and precipitating velocity of the liquid. This arrangement avoids any dead areas where impurities in the liquid tend to settle and accumulate. An accumulation of solid particles in the area of the bearing cavities tends to obstruct the free flow of liquid into and out of the cavities and hence unbalance the bearing. This in turn causes scoring of the bearing and shaft which results in excessive heating and bearing wear which may cause a premature breakdown of the motor pump unit.

Each bearing 24, 25 is provided with annular grooves 62 intermediate axially spaced sets of bearing cavities 55. These grooves 62 are used to accumulate the fluid that leaks from the pressure cavities 55 between the bore of the bearing and the shaft 12. The fluid that accumulates in these grooves 62 is directed back to the low pressure or intake side of the impeller 13 through axially extending conduits 63 in the bearing structure that are connected to the annular grooves 62. These conduits 63 are formed radially outward from the bore of the bearing to reduce circumferential leakage along the bore of the bearing. Fluid from the conduits 63 in the front bearing 24 flow through aperture 65 in the impeller and fluid from the conduits 63 in the rear bearing 25 flows through the hollow shaft 12 to the intake side of the impeller.

In operation, high pressure fluid is brought from a suitable source into the passages 58 in the bearing housings leading to each set of bearing cavities 55. In the illustrated pump unit this high pressure fluid is brought into the bearings 24, 25 from the discharge side of the pump 14 by suitable pipes 61, the passages 58 in the bearing housings 27, 47 and the annular grooves 59 which are directly connected to the pressure cavities 55 by radial holes 60 in the bearings. Of course, it is understood that these radial holes 60 are not interconnected with the axially extending relief conduits 63 in the bearing structure as shown in FIG. 2. The fluid in the cavities 55 supports the shaft as it rotates. Fluid passing from the cavities 55 flows between the shaft 12 or shaft liners 53 and the bore of the bearings 24, 25 into the annular grooves 62. From the grooves 62 the fluid flows through relief conduits 63 through holes in the impeller 13 to the suction side of the impeller where it mixes with the fluid being pumped.

Although but one embodiment has been illustrated and described, it will be apparent to those skilled in the art that various changes and modifications may be made therein without departing from the spirit of the invention or from the scope of the appended claims.

Having now particularly described and ascertained the nature of our said invention and the manner in which it is to be performed, we declare that what we claim is:

1. A bearing comprising: an annular member, the radially inner surface of said member defining axially spaced sets of circumferentially spaced cavities and annular grooves intermediate said sets of cavities, said member having holes extending radially inward from its outer surface to said cavities and axial conduits connecting said annular grooves to the outside of said member; hydraulically parallel passages connected to said holes for feeding fluid at substantially the same pressure into said cavities.

2. A bearing comprising a plurality of annular members in juxtaposition, the radially inner surface of each of said members defining circumferentially spaced cavities, said members having holes extending from its outer surface to said cavities, adjacent members combining to form annular grooves therebetween at the bore of said members, each of said members having axial conduits radially spaced from said bore and in communication with said annular grooves for conducting fluid to the outside of said members and hydraulically parallel passages connected to said holes for supplying fluid at substantially the same pressure and velocity to said cavities.

3. A motor pump unit comprising a stator, a rotor mounted within said stator, a cylindrical can positioned intermediate said rotor and said stator, a shaft coupled to said rotor, an impeller mounted on said shaft for rotation therewith, a casing surrounding said impeller and having a hydraulic inlet and outlet, a bearing housing connected to said casing and surrounding said shaft intermediate said rotor and said impeller, bearings mounted in said housing for supporting said shaft, the radially inner surface of said bearing defining a plurality of axially spaced sets of circumferentially arranged cavities and annular grooves intermediate said sets of said cavities, means connecting the outlet of said casing to said cavities for receiving a portion of the fluid being pumped, said means including separate passages in said bearing housing each of which is connected to a different one of said sets of cavities, said bearings having axially extending conduits radially spaced from said inner surface and communicating with the annular grooves in said bearings for conducting fluid away from said cavities, said impeller having apertures therein and communicating with said conduits for returning fluid to the inlet side of the impeller.

4. A motor pump unit comprising; a motor, a shaft coupled to said motor, a pump operatively connected to said shaft and having a hydraulic inlet and outlet, a bearing housing connected to said pump and surrounding said shaft, bearing means mounted in said housing for supporting said shaft, the radially inner surface of said bearing means defining a plurality of axially spaced sets of circumferentially arranged cavities and annular grooves intermediate said sets of said cavities, means connecting the outlet of said casing to said cavities for receiving a portion of the fluid being pumped, said means including separate passages in said bearing housing each of which is connected to a different one of said sets of cavities, said bearing means having axially extending conduits radially spaced from said inner surface and communicating with the annular grooves in said bearing means for conducting fluid away from said cavities, said pump having apertures therein in communication with said conduits for returning fluid to the inlet side of said pump.

5. A motor pump unit comprising; a stator, a rotor mounted within said stator, a shaft coupled to said rotor, a pump operatively connected to said shaft and having a hydraulic inlet and outlet, a first bearing housing connected to said pump and surrounding said shaft intermediate said pump and said rotor, a second bearing housing surrounding the end of said shaft removed from said pump, bearing means mounted in said housings for supporting said shaft, the radially inner surface of said bearings defining a plurality of axially spaced sets of circumferentially arranged cavities and annular grooves intermediate said sets of said cavities, means connecting the outlet of said casing to said cavities for receiving a portion of the fluid being pumped, said means including separate passages in said bearing housings each of which is connected to a different one of said sets of cavities, said bearing means having axially extending conduits radially spaced from said inner surface and communicating with the annular grooves in said bearing means for conducting fluid away from said cavities, said pump having apertures therein in communication with said conduits for returning fluid to the inlet side of the pump.

6. A motor pump unit comprising; a stator, a rotor mounted within said stator, a cylindrical can positioned intermediate said rotor and said stator, a shaft coupled to said rotor, an impeller mounted on said shaft for rotation therewith, a casing surrounding said impeller and having a hydraulic inlet and outlet, a first bearing housing connected to said casing and surrounding said shaft intermediate said rotor and said impeller, a second bearing housing surrounding the end of said shaft removed from said impeller, bearing means mounted in said housings for supporting said shaft, the radially inner surface of said bearings defining a plurality of axially spaced sets of circumferentially arranged cavities and annular grooves intermediate said sets of said cavities, means connecting the outlet of said casing to said cavities for receiving a portion of the fluid being pumped, said means including separate passages in said bearing housings each of which is connected to a different one of said sets of cavities, said bearings having axially extending conduits radially spaced from said inner surface and communicating with the annular grooves in said bearings for conducting fluid away from said cavities, said impeller having apertures therein in communication with said conduits for returning fluid to the inlet side of the impeller.

References Cited in the file of this patent

UNITED STATES PATENTS

| | | |
|---|---|---|
| 2,049,343 | Warren | July 28, 1938 |
| 2,669,187 | Guyer | Feb. 16, 1954 |
| 2,941,476 | Pezzilio | June 21, 1960 |
| 2,942,555 | Pezzilio | June 28, 1960 |
| 2,956,502 | Glaser | Oct. 18, 1960 |